(12) United States Patent
Motowaki

(10) Patent No.: US 10,857,683 B2
(45) Date of Patent: Dec. 8, 2020

(54) ROBOT HAND

(71) Applicant: Fanuc Corporation, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/549,511

(22) Filed: Aug. 23, 2019

(65) Prior Publication Data

US 2020/0101623 A1 Apr. 2, 2020

(30) Foreign Application Priority Data

Sep. 28, 2018 (JP) .................................. 2018-183346

(51) Int. Cl.
*B25J 15/08* (2006.01)
(52) U.S. Cl.
CPC ..................................... *B25J 15/08* (2013.01)
(58) Field of Classification Search
CPC ........ B25J 15/08; B25J 15/0616; B25G 47/91
USPC ............................................. 294/207, 119.1
See application file for complete search history.

(56) References Cited

U.S. PATENT DOCUMENTS

| 4,750,132 | A | * | 6/1988 | Pessina | B65G 61/00 |
| | | | | | 212/286 |
| 4,765,668 | A | * | 8/1988 | Slocum | B25J 15/0052 |
| | | | | | 294/119.1 |
| 5,080,415 | A | * | 1/1992 | Bjornson | B25J 15/103 |
| | | | | | 294/119.1 |
| 5,975,837 | A | * | 11/1999 | Focke | B65G 47/90 |
| | | | | | 294/119.1 |
| 6,592,324 | B2 | * | 7/2003 | Downs | B25J 15/0253 |
| | | | | | 294/104 |
| 8,616,599 | B2 | * | 12/2013 | Motonaga | B25J 15/026 |
| | | | | | 294/119.1 |
| 8,651,543 | B2 | * | 2/2014 | Matsuoka | B66C 1/42 |
| | | | | | 294/192 |
| 2002/0053774 | A1 | | 5/2002 | Yamazaki et al. | |
| 2002/0093212 | A1 | * | 7/2002 | Ostholt | B25J 15/0253 |
| | | | | | 294/119.1 |

(Continued)

FOREIGN PATENT DOCUMENTS

| EP | 1222985 A1 | 7/2002 |
| JP | H02135751 A | 5/1990 |

(Continued)

*Primary Examiner* — Paul T Chin

(74) *Attorney, Agent, or Firm* — Shackelford, Bowen, McKinley & Norton, LLP

(57) ABSTRACT

A robot hand includes a first portion, and a second portion detachable from the first portion, including a pair of holding pieces for holding a workpiece. The first portion includes a first movable member movable in one direction by a first stroke, an actuator which moves the first movable member. The second portion includes a second base which is detachably attached to the attaching and detaching mechanism, and a second movable member movable in one direction by a second stroke which is larger than the first stroke. At least one of the holding pieces is fixed to the second movable member. A first engaging portion is provided in the first movable member, second engaging portions are provided in the second movable member, and the second engaging portion can be engaged with the first engaging portion.

4 Claims, 12 Drawing Sheets

(56) References Cited

U.S. PATENT DOCUMENTS

| | | | |
|---|---|---|---|
| 2004/0051328 A1* | 3/2004 | Cinotti | B65H 31/3045 |
| | | | 294/119.1 |
| 2018/0178396 A1 | 6/2018 | Ochiishi | |
| 2019/0382214 A1* | 12/2019 | Motowaki | B25J 15/0616 |

FOREIGN PATENT DOCUMENTS

| | | |
|---|---|---|
| JP | 2003159606 A | 6/2003 |
| JP | 2014237212 A | 12/2014 |
| JP | 2015213430 A | 11/2015 |
| JP | 2018103294 A | 7/2018 |

* cited by examiner

ROBOT HAND

CROSS-REFERENCE TO RELATED APPLICATIONS

This application is based on and claims priority to Japanese Patent Application No. 2018-183346 filed on Sep. 28, 2018, the content of which is incorporated herein by reference in its entirety.

TECHNICAL FIELD

This invention relates to a robot hand.

BACKGROUND ART

Conventionally, as a robot hand which is capable of holding workpieces which are ranging from a small one to a large one, a servo hand with a large stroke, which can change an open-close space between a pair of holding pieces, or a robot hand using an actuator with a large stroke, such as an air cylinder, and the like, is known. (See PTL 1, for example.)

CITATION LIST

Patent Literature

{PTL 1}
Japanese Unexamined Patent Application, Publication No. 2018-103294

SUMMARY OF INVENTION

A first aspect of the present invention is a robot hand which includes a first portion attached to a distal end of a robot; and a second portion which is detachably attached to the first portion and which includes a pair of holding pieces capable of holding a workpiece, wherein, the first portion includes a first base attached to the robot, a first movable member which is supported so as to be movable in one direction with respect to the first base by a first stroke, an actuator which moves the first movable member, and an attaching and detaching mechanism which is provided in the first base and to which the second portion is detachably attached, and the second portion includes a second base which is detachably attached to the attaching and detaching mechanism, and a second movable member which is supported so as to be movable in one direction with respect to the second base by a second stroke which is larger than the first stroke, wherein at least one of the holding pieces is fixed to the second movable member, wherein a first engaging portion is provided in the first movable member, and a plurality of second engaging portions are provided in the second movable member at an interval equal to or shorter than the first stroke in a moving direction of the second movable member, wherein the second engaging portions engage with the first engaging portion at a position where the second base is attached to the attaching and detaching mechanism.

DESCRIPTION OF EMBODIMENTS

A robot hand 1 according to a first embodiment of the present invention will be described below with reference to the accompanying drawings.

Figure 1:
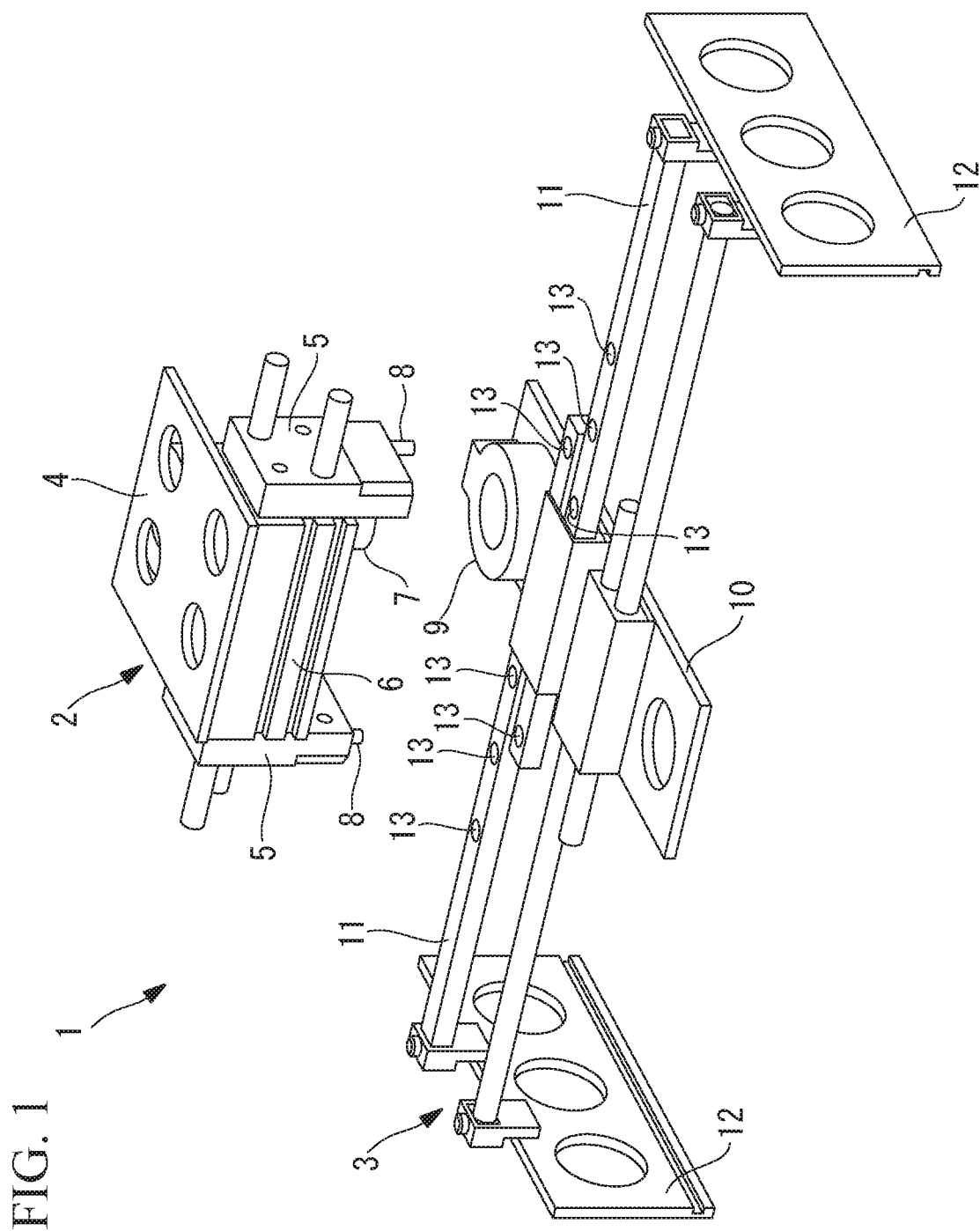
FIG. 1 is a perspective view showing a state where a first portion and a second portion of a robot hand are separated from each other according to an embodiment of the present invention.

As shown in FIG. 1, the robot hand 1 according to this embodiment includes a first portion 2 which is attached to a distal end of a robot, and a second portion 3 which is detachably attached to the first portion 2.

The first portion 2 includes a first base 4 which is attached to the distal end of the robot, and a pair of first movable members 5 which are supported so as to be linearly movable along one direction with respect to the first base 4, a cylinder (an actuator) 6, such as an air cylinder, which is fixed to the first base 4 and which simultaneously moves the pair of the first movable members 5 in opposite directions from each other, and an ATC (an attaching and detaching mechanism) 7 which is fixed to the first base 4. A stroke of each of the pair of the first movable members by the cylinder 6 is a predetermined first stroke.

By linearly moving the robot, to which the first portion 2 is attached, in a direction orthogonal to a moving direction of the first movable members 5 (referred to as attaching and detaching direction hereinafter), the ATC 7 causes the first portion 2 to get close to the second portion 3 so as to detachably attach the second portion 3.

On a distal end surface of each of the first movable members 5 in the above described attaching and detaching direction, a pin (a first engagement portion; a protrusion) 8 which extends in the attaching and detaching direction is provided. The pin 8 of each of the first movable members 5 is placed at a position which is deviated by a predetermined dimension in the direction which is orthogonal to the attaching and detaching direction.

The second portion 3 includes a second base 10 having an attachment portion 9 which is attached to and detached from the ATC 7, a pair of second movable members 11 which are supported so as to be linearly movable along one direction with respect to the second base 10, and a pair of holding pieces 12, which are fixed to the second movable members 11, respectively and which face to each other.

The second movable members 11 are supported by the second base 10 so as to be lineally movable within a second stroke which is sufficiently larger than the first stroke.

When the ATC 7 is placed at a position where the attachment portion 9 can be attached, each of the second movable members 11 is placed at a position where the distal end surface of each of the first movable members 5 abuts against the second movable members 11, and the second movable members 11 respectively include a plurality of holes (second engagement portions; concave portions) 13 with which the pin 8 provided in each of the first movable members 11 can be fit. The plurality of the holes 13 are arranged in the moving direction of the second movable members 11 at an interval which is the same as the first stroke.

The pair of the second movable members 11 are placed at positions which are deviated from each other by a predetermined dimension in a direction orthogonal to the moving direction so as to be parallel to each other. The amount of deviation of the second movable members 11 is equal to the amount of deviation of the above described pins 8 of the first movable members 5.

Operation of the robot hand 1 according to the embodiment of the present invention, which is configured as described above, will be described below.

Figure 2:
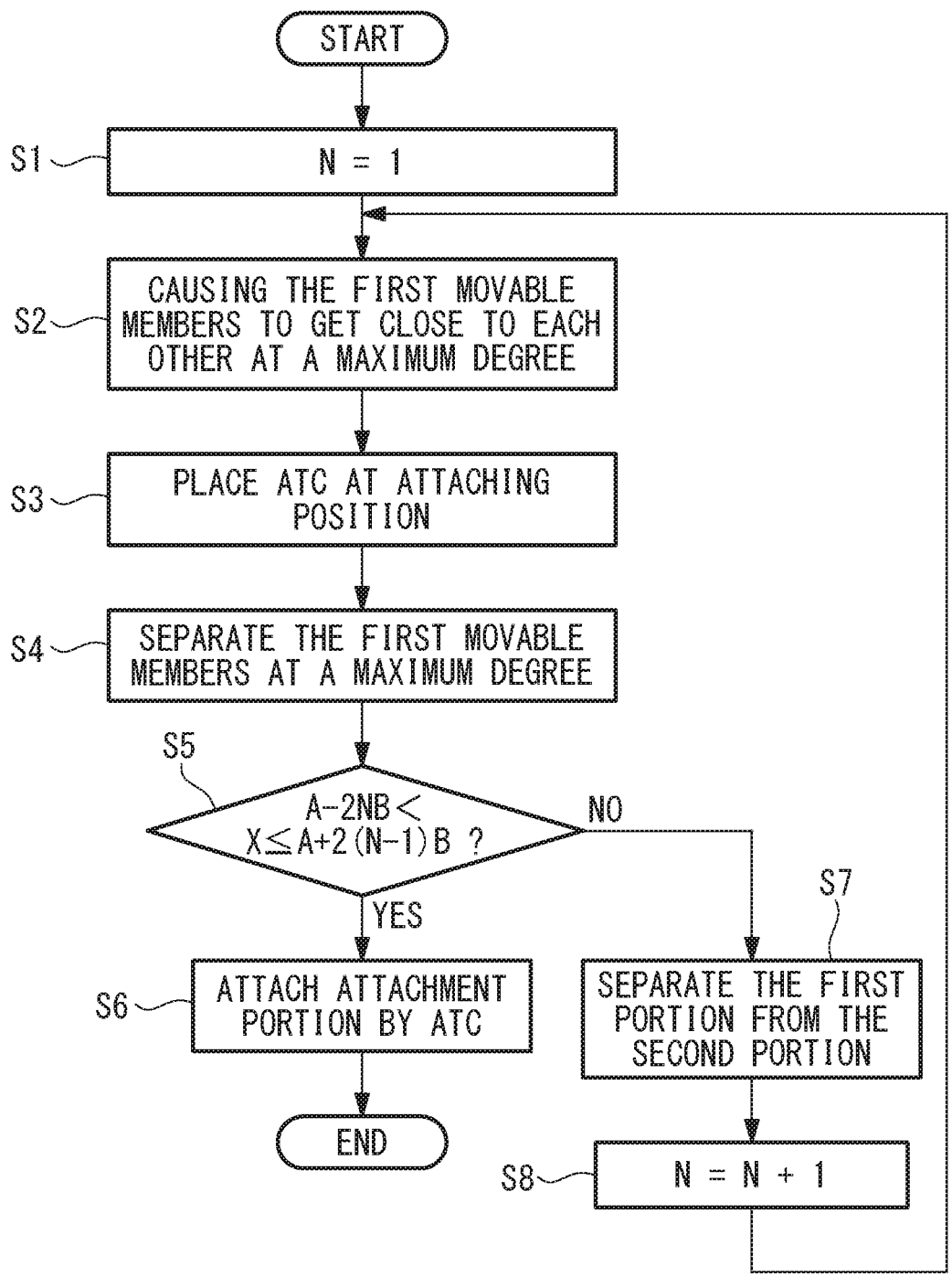
FIG. 2 is a flow chart explaining operation of the robot hand of FIG. 1.

In order to hold the largest workpiece (refer to FIG. 5) W by using the robot hand 1 according to this embodiment, the pair of the holding pieces 12 of the second portion 3 are in a state where the holding pieces 12 are placed at positions which are most distant from each other as shown in FIG. 1. And, as shown in FIG. 2, a coefficient N is initialized (Step S1), and the pair of the first movable members 5 are in a state where they are closest to each other by operation of the cylinder 6 of the first portion 2 (Step S2).

Figure 3:
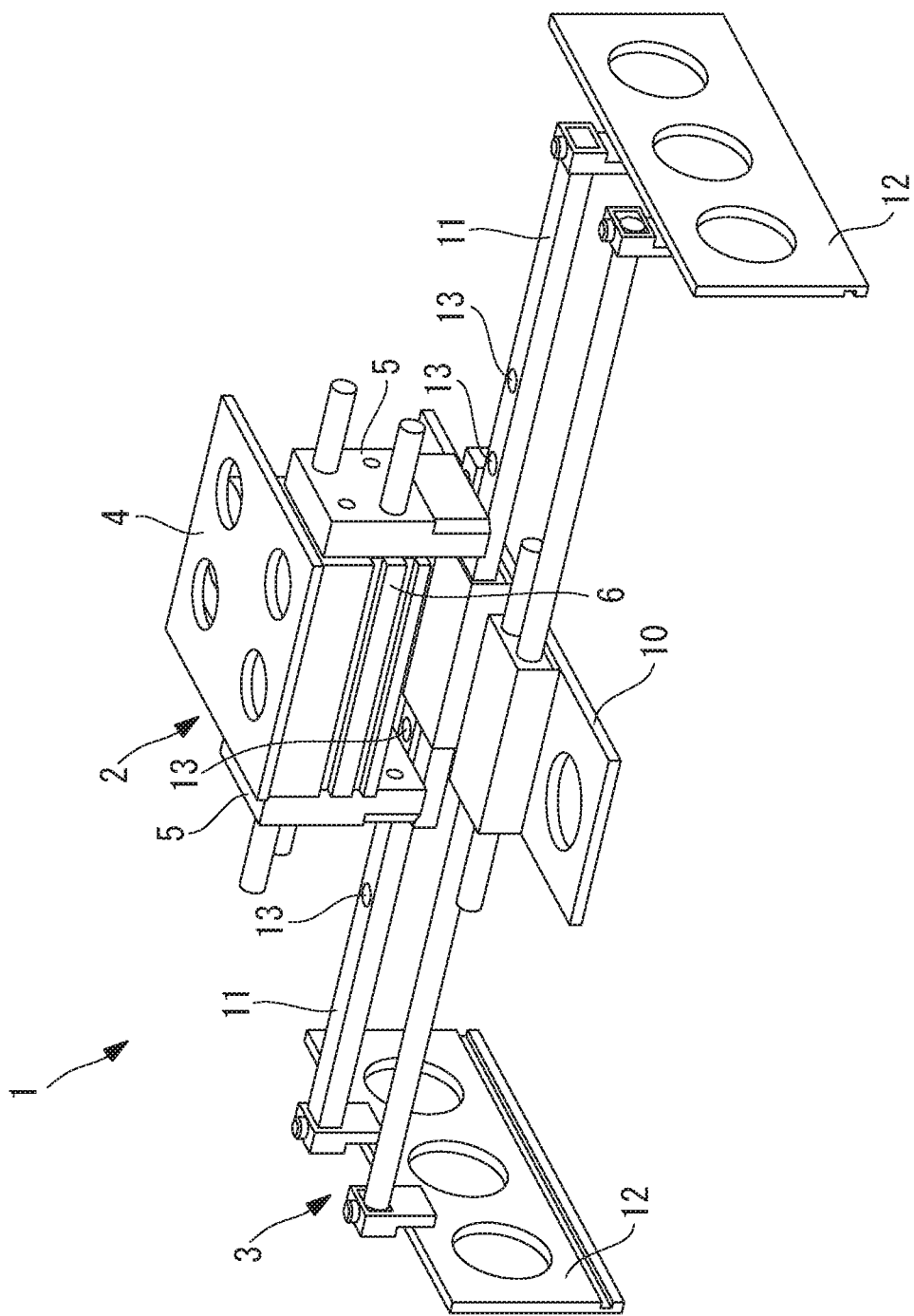
FIG. 3 is a perspective view showing a state where a pair of holding pieces of the robot hand of FIG. 1 are separated from each other at a maximum degree, and the first portion is placed at an attachment position with the second portion.

By operating the robot, the first portion 2 is moved in the attaching and detaching direction so as to cause the first portion 2 to get close to the second portion 3, and as shown in FIG. 3, the ATC 7 is placed at the attaching position of the attachment portion 9 (Step 3). At this position, the distal end surface of each of the first movable members 5, which is provided at the first portion 2, is placed at a position where the distal end surface of each of the first movable members 5 abuts against the second movable members 11 of the second portion 3, and the pin 8 of each of the first movable members 5 is mated with the hole 13 of the second movable members 11. By this, the first movable members 5 and the second movable members 11 are engaged with each other in the moving direction of the first movable members 5 and the second movable members 11.

Figure 4:
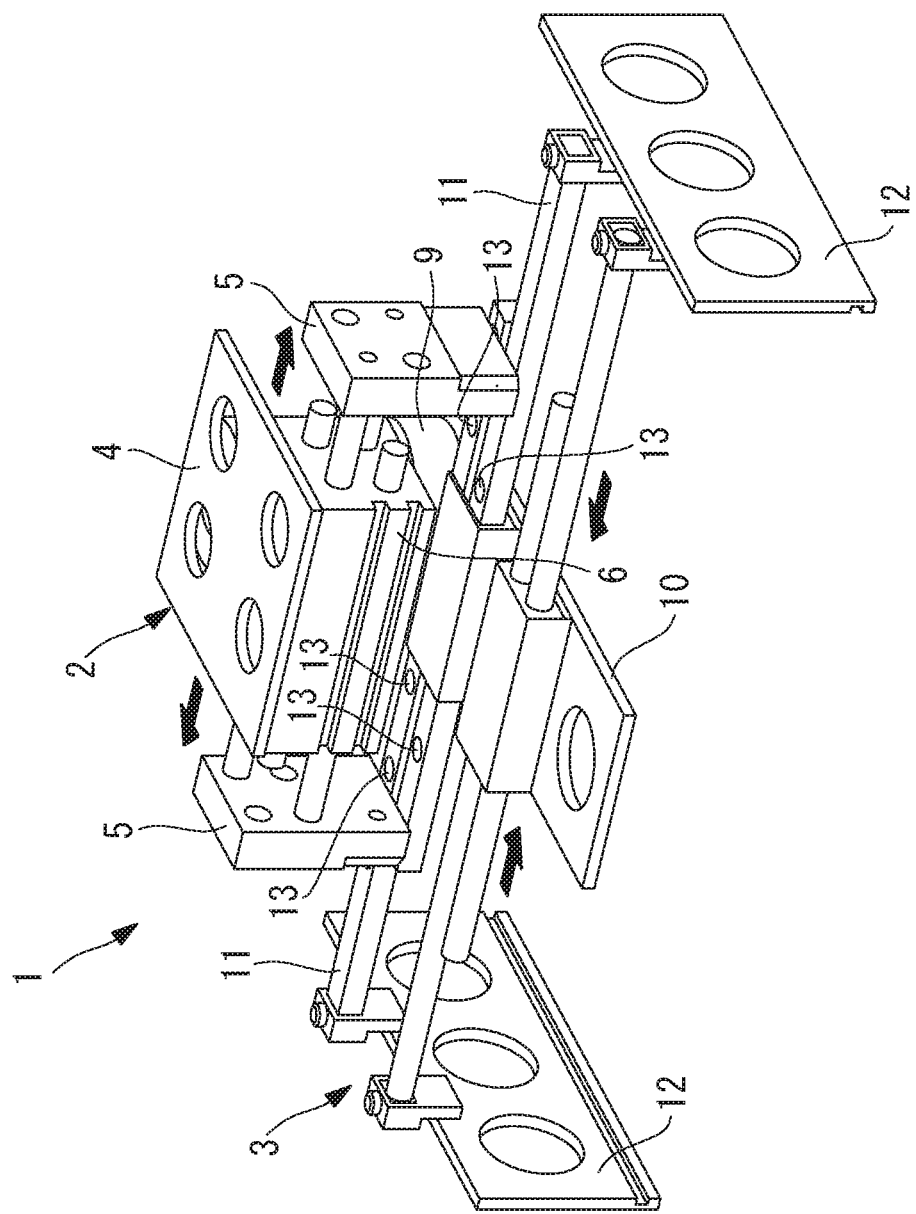
FIG. 4 is a perspective view showing a state where a distance between the pair of the holding pieces of FIG. 3 is shortened by a stroke of a cylinder.

As shown in FIG. 4, in this state, by driving the cylinder 6, the pair of the first movable members 5 are separated from each other at a maximum degree as indicated by arrows (Step S4), which causes the second movable members 11, which are engaged with the first movable members 5, to get close to each other. That is to say, in this state, each of the pair of the holding pieces 12 is moved respectively by a stroke B of the cylinder 6 from a distance A which is most distant from each other, and the pair of the holding pieces 12 can hold a workpiece W having a width dimension X which is shown in the below described conditional expression (1).

$$A-2NB<X\le A+2(N-1)B \qquad (1)$$

In such a case where the workpiece W has the width dimension X which satisfies the above described conditional expression (i) (Step S5), by attaching the attachment portion 9 by the operation of the ATC 7, the first portion 2 and the second portion 3 are connected with each other so as to form a single robot hand 1 (Step S6).

Figure 5:
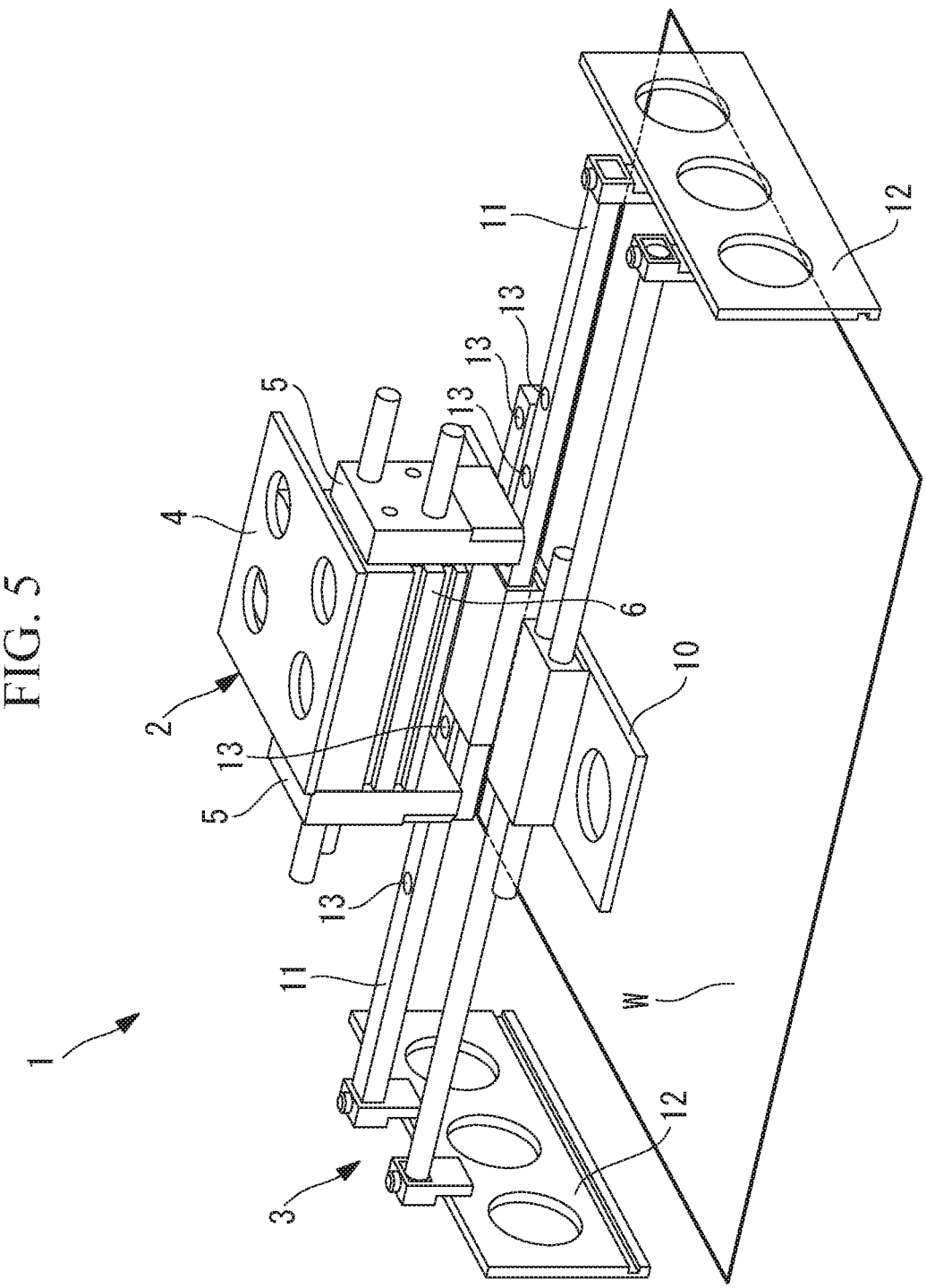
FIG. 5 is a perspective view explaining operation for holding a workpiece with a large width dimension by using a robot hand in which the first portion and the second portion are connected by an attaching and detaching mechanism in the state shown in FIG. 3.
Figure 6:
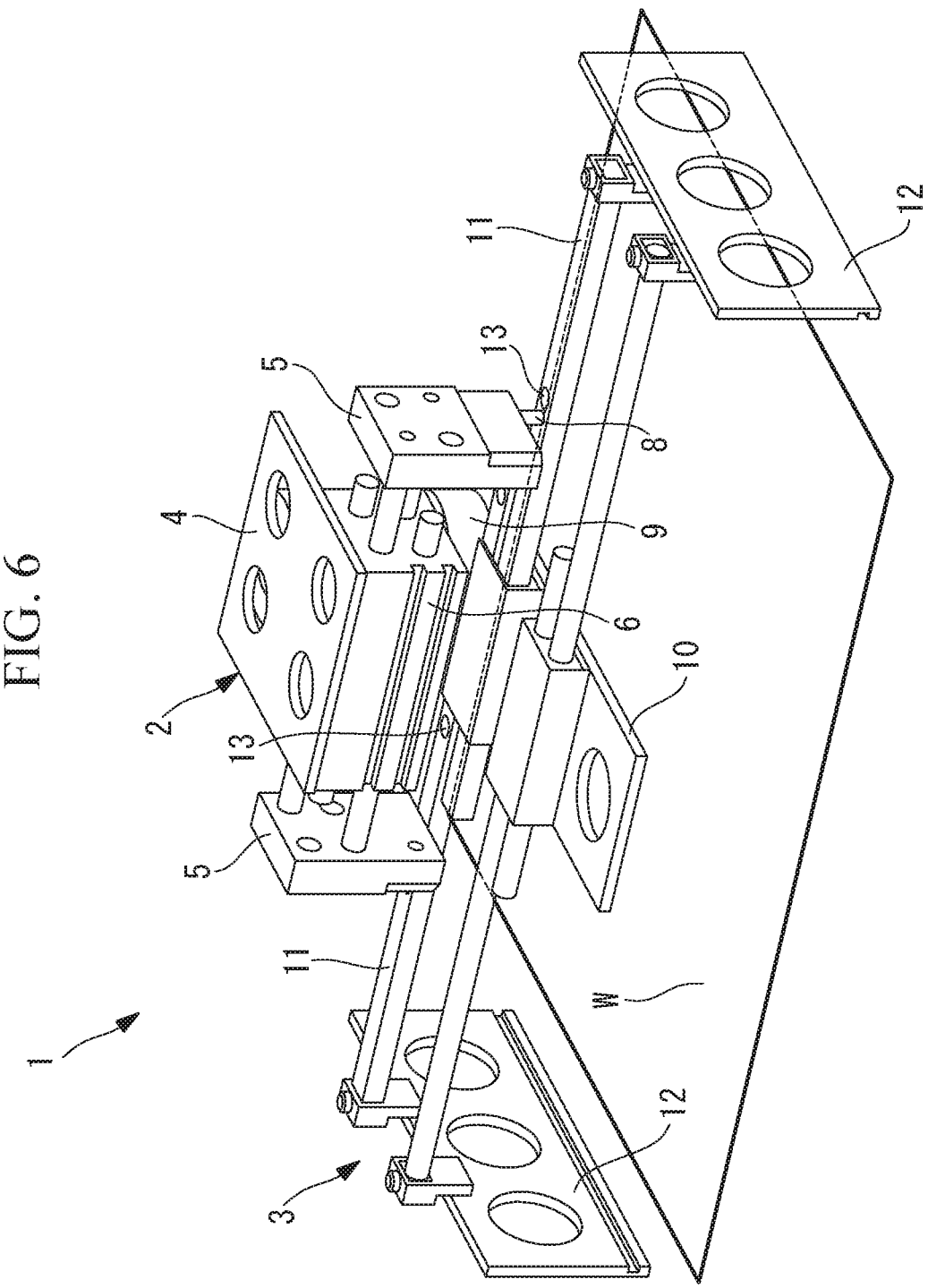
FIG. 6 is a perspective view showing a state where the robot hand of FIG. 5 is placed at a holding position for holding the workpiece.
Figure 7:
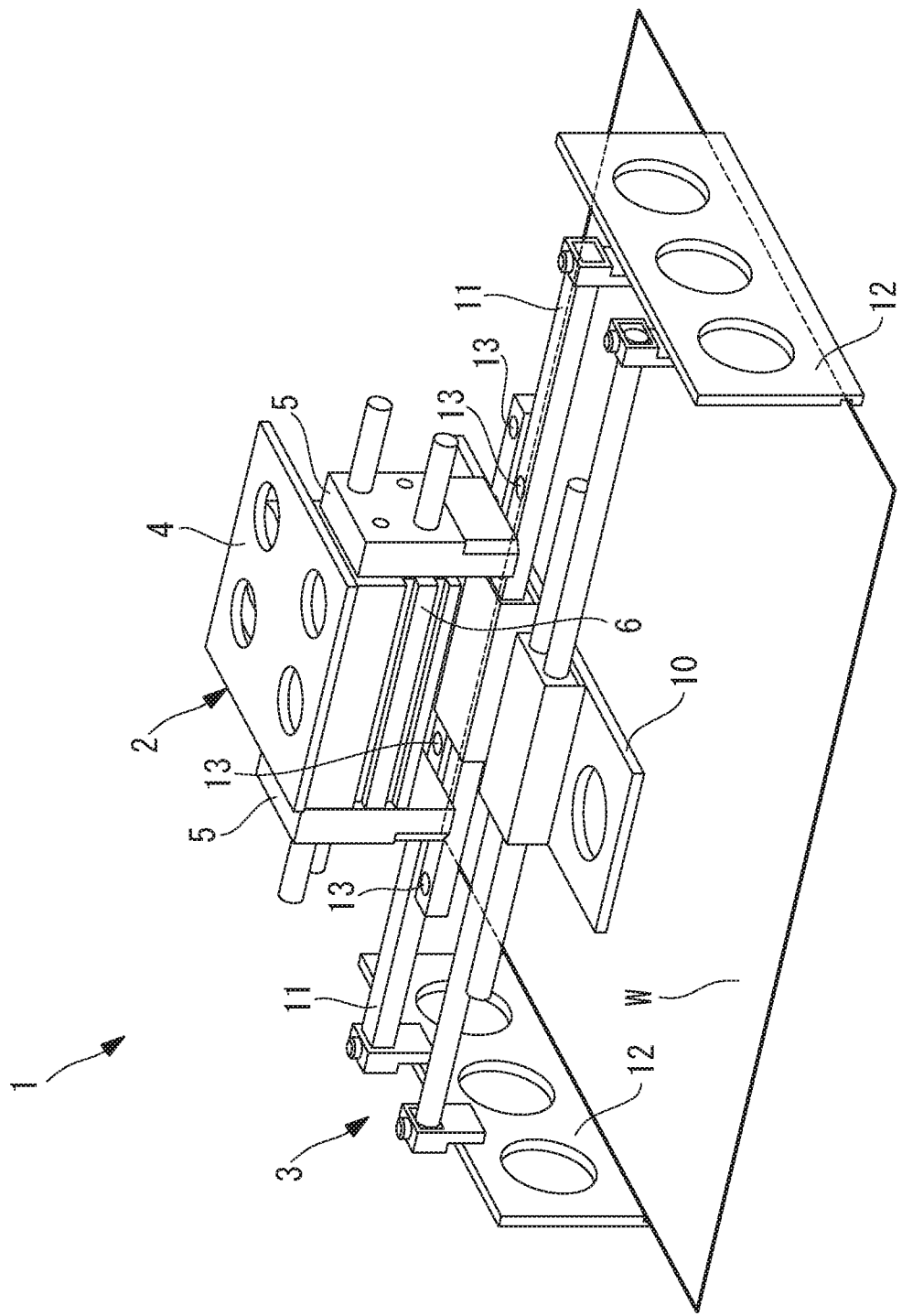
FIG. 7 is a perspective view showing a state where the workpiece is held by using the robot hand of the FIG. 6.

And therefore, as shown in FIGS. 5 to 7, by driving the cylinder 6 which has the short stroke, it is possible to hold the workpiece W which has the maximum width dimension X.

Figure 8:
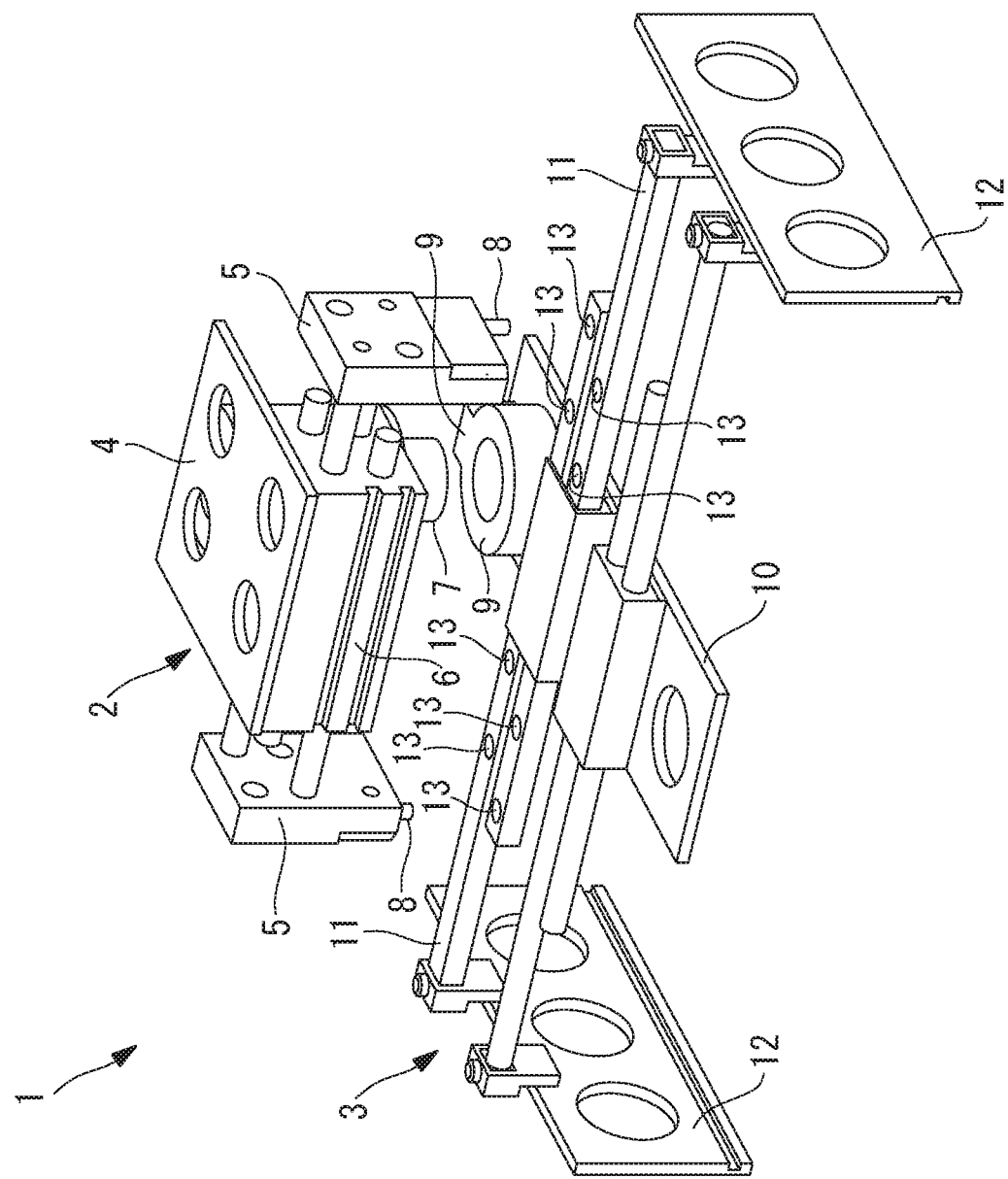
FIG. 8 is a perspective view showing a state where the first portion of the robot hand of FIG. 4 is separated from the second portion.
Figure 9:
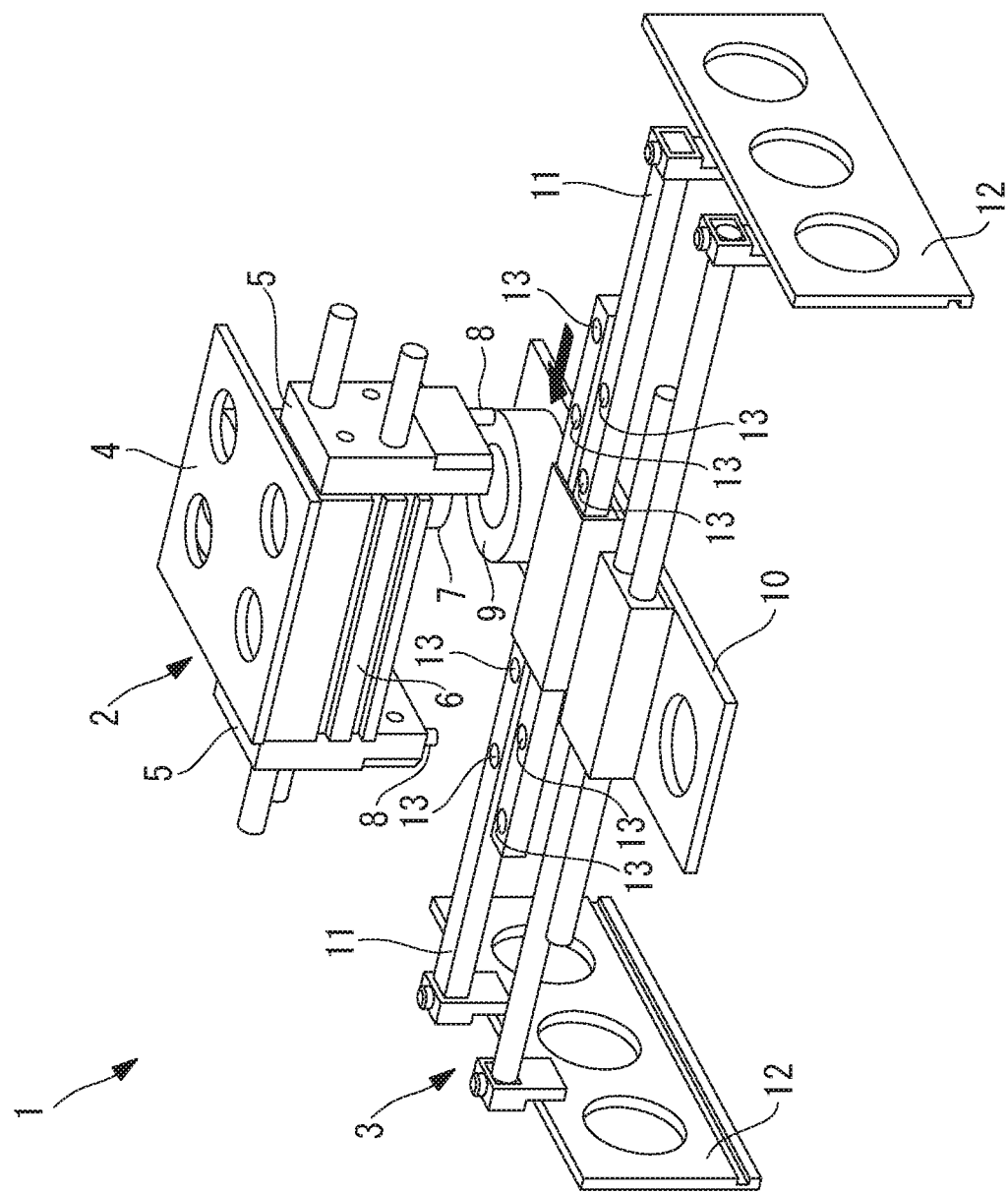
FIG. 9 is a perspective view showing a state where first movable members of the first portion of the robot hand of FIG. 3 get close to each other at a maximum degree.

In order to hold a workpiece W whose width dimension X is equal to or less than the lower limit of the conditional expression (1), as shown in FIG. 8, the first portion 2 is temporarily separated from the second portion 3 in the attaching and detaching direction by the operation of the robot (Step S7), the coefficient N is incremented (Step S8), and as shown in FIG. 9, the processes after Step S2 are repeatedly performed.

Figure 10:
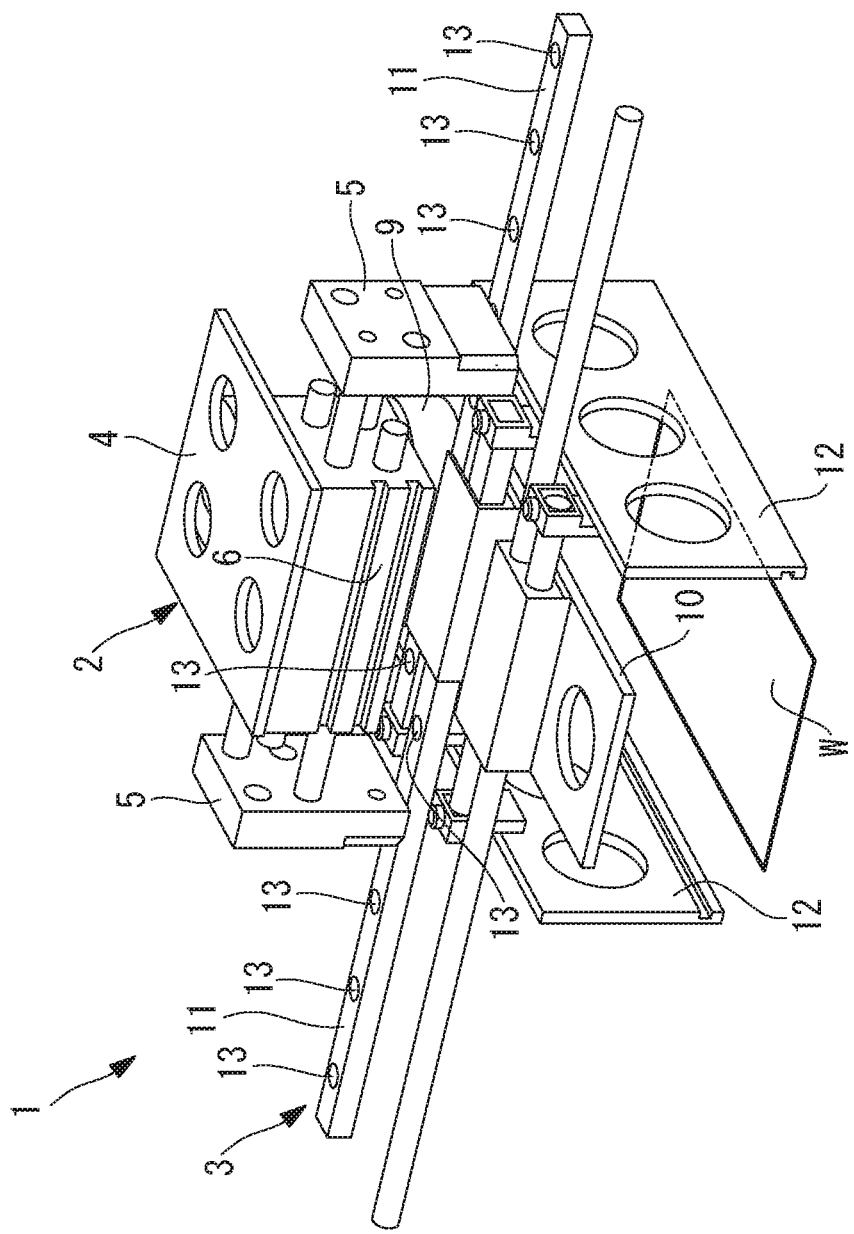
FIG. 10 is a perspective view explaining operation for holding a workpiece with a small width dimension by using the robot hand in which the first portion and the second portion are connected by the attaching and detaching mechanism.
Figure 11:
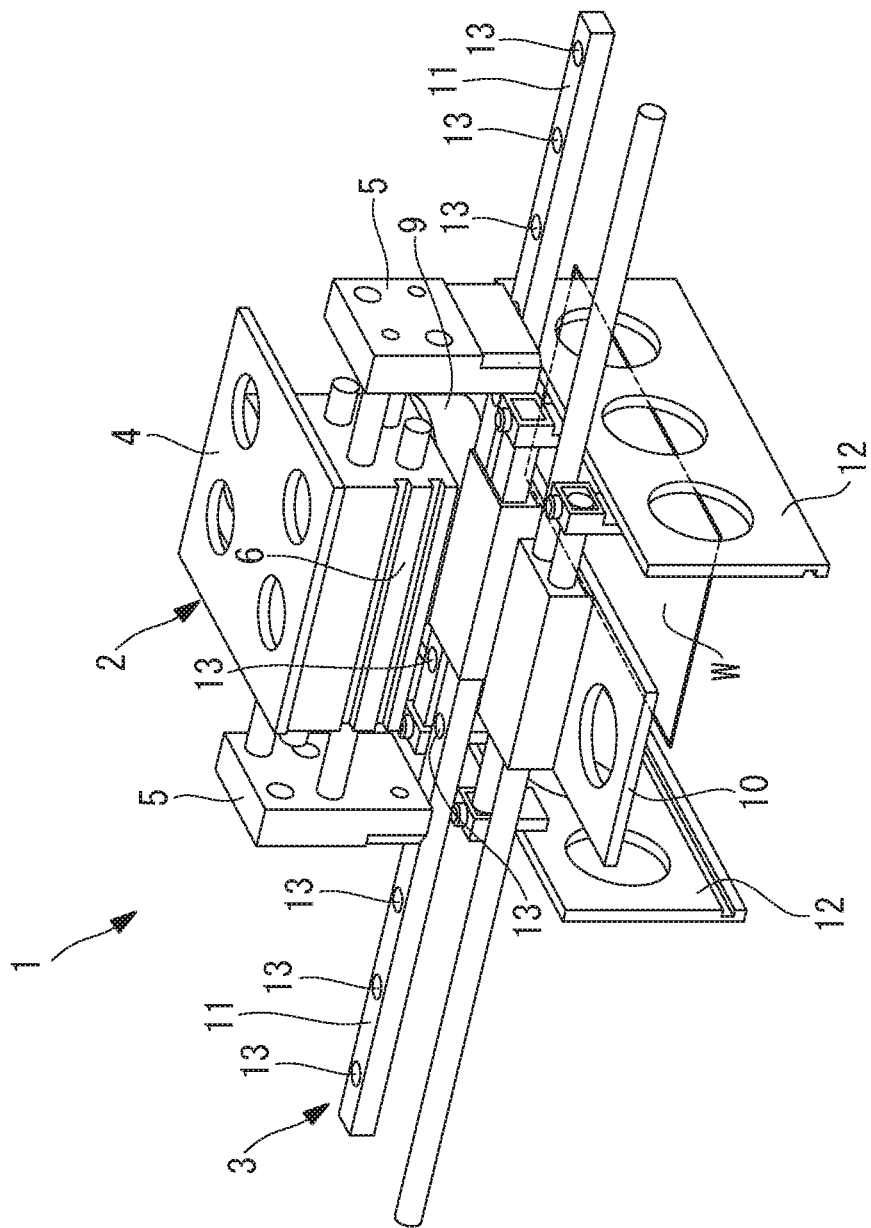
FIG. 11 is a perspective view showing a state where the robot hand of FIG. 10 is placed at a holding position of the workpiece.
Figure 12:
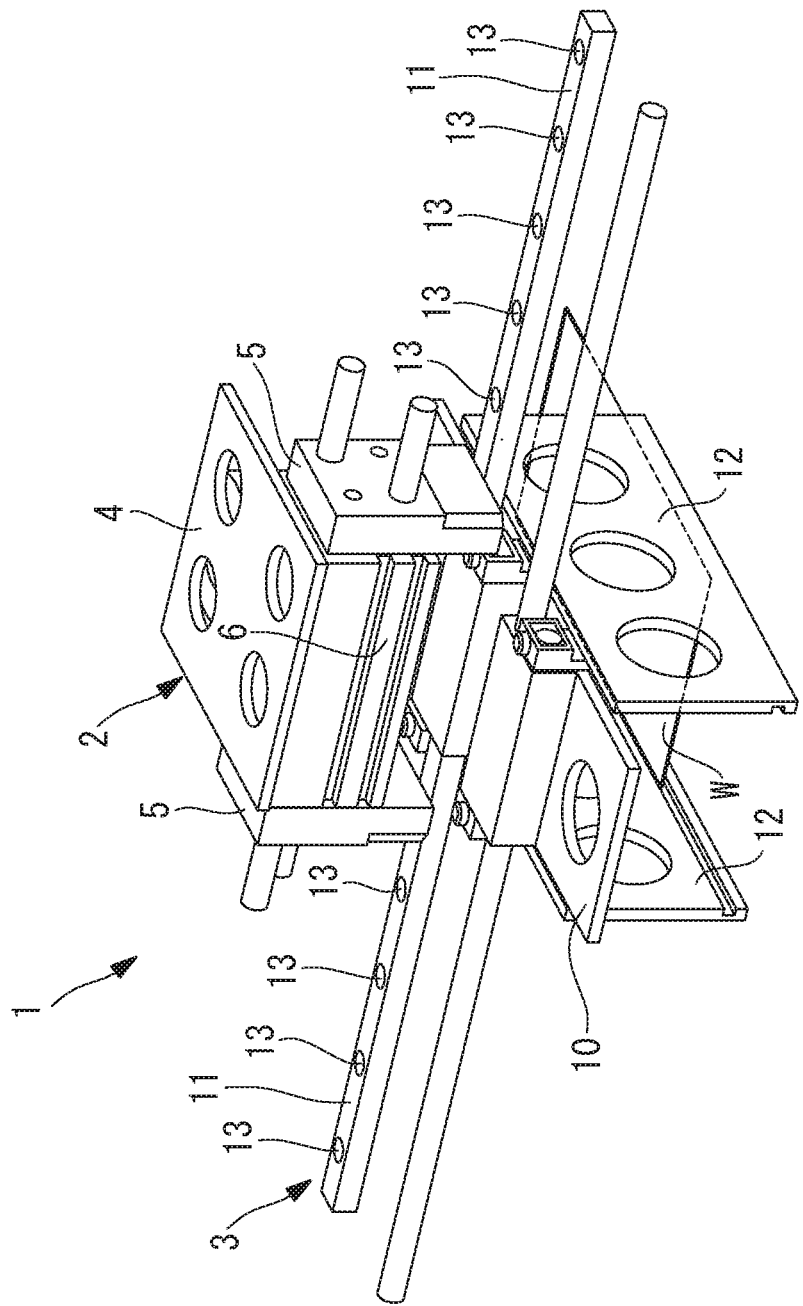
FIG. 12 is a perspective view showing a state where the workpiece is held by using the robot hand of FIG. 11.

By this, it is possible to engage the pin 8 with a neighboring hole 13, and a range of stroke of the holding pieces 12 is moved inward so that a workpiece W with smaller width dimension can be held as shown in FIG. 10 to FIG. 12.

As described above, with the robot hand 1 according to this embodiment, while reducing the stroke of the cylinder 6 to a first stroke which is relatively small, it is possible to hold the workpieces W whose size is different from each other in such a range that the first stroke cannot cover. That is to say, this embodiment is advantageous for holding the workpieces W whose dimensions are largely different from each other while reducing the weight of the robot hand 1 by using the cylinder 6 which moves with the small stroke.

Also, in this embodiment, the moving direction of the first movable members 5 of the first portion 1 and the moving direction of the second movable members 11 of the second portion 3 are opposite from each other, however, it is not limited thereto, and the first and the second movable members 5, 11 may be moved in the same direction.

And, the pin 3 is provided in each of the first movable members 5, and the holes 13 are provided in each of the second movable members 11, however, they may be provided in an opposite manner.

Moreover, the plurality of holes 13 are provided in the second movable members 11 at a same pitch as the stroke of the cylinder 6, however, with an actuator which is capable of adjusting the stroke, the interval between the holes 13 is not necessarily limited to the same stroke as the first stroke so long as the interval thereof is equal to or shorter than the first stroke. A linear motion mechanism such as a motor, a ball screw, and the like may be adopted as the actuator which is capable of adjusting the stroke.

In addition, in this embodiment, the pair of the first movable members 5 and the pair of the second movable members 11 are provided so as to form the robot hand 1 which moves both of the pair of the holding pieces 12 in the opposite directions from each other at the same stoke, however, instead of this configuration, a single first movable member 5 and a single second movable member 11 may be provided while fixing one of the holding pieces 12.

The following aspects of the present invention are derived from the above disclosure.

A first aspect of the present invention is a robot hand which includes a first portion attached to a distal end of a robot; and a second portion which is detachably attached to the first portion and which includes a pair of holding pieces capable of holding a workpiece, wherein, the first portion includes a first base attached to the robot, a first movable member which is supported so as to be movable in one direction with respect to the first base by a first stroke, an actuator which moves the first movable member, and an attaching and detaching mechanism which is provided in the first base and to which the second portion is detachably attached, and the second portion includes a second base which is detachably attached to the attaching and detaching mechanism, and a second movable member which is supported so as to be movable in one direction with respect to the second base by a second stroke which is larger than the first stroke, wherein at least one of the holding pieces is fixed to the second movable member, wherein a first engaging portion is provided in the first movable member, and a plurality of second engaging portions are provided in the second movable member at an interval equal to or shorter than the first stroke in a moving direction of the second movable member, wherein the second engaging portions engage with the first engaging portion at a position where the second base is attached to the attaching and detaching mechanism.

According to this embodiment, by moving the first portion which is attached to the distal end of the robot to an attaching position with the second portion by operation of the robot, and in a state where the first engaging portion which is provided in the first movable member of the first portion is engaging with any of the second engaging portions which are provided in the second movable member of the second portion, the second portion is attached to the first portion by operation of the attaching and detaching mechanism. Accordingly, by reciprocating the first movable member in one direction by the first stroke due to operation of the actuator, the second movable members are also caused so reciprocate in one direction by the first stroke, which allows the robot hand to hold a workpiece with size which can be placed within a range of stroke of the pair of the holding pieces at that time.

In order so hold a workpiece which is larger than the range of stroke of the pair of the holding pieces (referred to as a first range of stroke), as a state in which the pair of the holding pieces are separated at a maximum degree due to the operation of the actuator, the first portion and the second portion are separated by the operation of the attaching and detaching mechanism, and the first portion is retracted to a position where the engagement between the first engaging portion and the second engaging portion is disengaged. In this state, the actuator is operated, and the pair of the holding pieces are caused to get close to each other by multiplying the interval between the second engagement members by integral times, and again, the first portion is placed at the attaching position with the second portion.

By this, the first engaging portion and the second engaging portion become a state where they are engaged again, and therefore, by attaching the second portion to the first portion by the attaching and detaching mechanism at this position, the pair of the holding pieces move within a new range of stroke in which the pair of the holding pieces reciprocate outside the above described first range of stroke by the first stroke. In order to hold a workpiece which is even larger than the new range of stroke, it is possible to gradually widen the interval between the pair of the holding pieces by repeatedly performing the above operation.

That is to say, according to this aspect, the actuator which is driven by the small stroke is used so that the robot hand can hold the workpieces whose dimensions are largely different from each other while reducing the weight of the robot hand itself.

With the above aspect, one of the first engaging portion and the second engaging portion may be a protrusion, and the other one may be a concave portion which can be mated with the protrusion.

With this configuration, by the operation which moves the first portion to the attaching position with the second portion, the protrusion and the concave portion are engaged with each other in a simplified manner, and by the operation of the actuator, the interval between the pair of the holding pieces can be changed.

And, with the above aspect, the actuator may be an air cylinder.

With this configuration, in such a case where the first stroke is short enough, by configuring the actuator by the air cylinder, it is possible to effectively achieve downsizing and weight reduction of the first portion.

Also, with the above aspect, the robot hand may include a pair of the first movable members and a pair of the second movable members, and the actuator simultaneously moves the pair of the first movable members in directions opposite from each other.

Due to this configuration, by moving the pair of the first movable members simultaneously in the opposite directions from each other while engaging the first engaging portion, which is provided at each of the pair of the first movable members, with the second movable portion which is provided at each of the pair of the second movable members, the pair of the holding pieces which are provided at the pair of the second movable members are moved simultaneously in the opposite directions from each other so that a robot hand with a double-sided moving structure can be configured.

According to the above disclosure, such effect that a robot hand can hold workpieces whose dimensions are largely different from each other while reducing its own weight is provided.

REFERENCE SIGNS LIST 1 robot hand
2 first portion
3 second portion
4 first base
5 first movable member
6 cylinder (actuator)
7 ATC (attaching and detaching mechanism)
8 pin (first engagement portion, protrusion)
10 second base
11 second movable member
12 holding pieces
14 hole (second engagement portion, concave portion)
W workpiece

The invention claimed is:
1. A robot hand comprising:
a first portion attached to a distal end of a robot; and
a second portion which is detachably attached to the first portion and which includes a pair of holding pieces capable of holding a workpiece, wherein,
the first portion includes a first base attached to the robot, a first movable member which is supported so as to be movable in one direction with respect to the first base by a first stroke, an actuator which moves the first movable member, and an attaching and detaching mechanism which is provided in the first base and to which the second portion is detachably attached, and the second portion includes a second base which is detachably attached to the attaching and detaching mechanism, and a second movable member which is supported so as to be movable in one direction with respect to the second base by a second stroke which is larger than the first stroke, wherein at least one of the holding pieces is fixed to the second movable member, wherein a first engaging portion is provided in the first movable member, and a plurality of second engaging portions are provided in the second movable member at an interval equal to or shorter than the first stroke in a moving direction of the second movable member, wherein the second engaging portions engage with the first engaging portion at a position where the second base is attached to the attaching and detaching mechanism.

2. The robot hand according to claim 1, wherein one of the first engaging portion and the second engaging portion is a protrusion, and the other one is a concave portion which can be mated with the protrusion.

3. The robot hand according to claim 1, wherein the actuator is an air cylinder.

4. The robot hand according to claim 1, wherein the robot hand comprises a pair of the first movable members and a pair of the second movable members, and the actuator simultaneously moves the pair of the first movable members in directions opposite from each other.

* * * * *